United States Patent
Niu et al.

(10) Patent No.: US 10,705,349 B2
(45) Date of Patent: Jul. 7, 2020

(54) DUAL-VIEW NAKED-EYE 3D DISPLAY DEVICE AND MANUFACTURING METHOD THEREOF, LIQUID CRYSTAL DISPLAY DEVICE

(71) Applicants: BOE Technology Group Co., Ltd., Beijing (CN); Beijing BOE Optoelectronics Technology Co., Ltd., Beijing (CN)

(72) Inventors: Xiaochen Niu, Beijing (CN); Xue Dong, Beijing (CN); Wenqing Zhao, Beijing (CN); Xiaochuan Chen, Beijing (CN); Jian Gao, Beijing (CN); Pengcheng Lu, Beijing (CN); Ming Yang, Beijing (CN); Qian Wang, Beijing (CN); Rui Xu, Beijing (CN); Lei Wang, Beijing (CN); Pengpeng Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 142 days.

(21) Appl. No.: 15/509,434

(22) PCT Filed: Aug. 5, 2016

(86) PCT No.: PCT/CN2016/093607
§ 371 (c)(1),
(2) Date: Mar. 7, 2017

(87) PCT Pub. No.: WO2017/118007
PCT Pub. Date: Jul. 13, 2017

(65) Prior Publication Data
US 2018/0149878 A1 May 31, 2018

(30) Foreign Application Priority Data
Jan. 8, 2016 (CN) .......................... 2016 1 0012569

(51) Int. Cl.
*G02B 27/22* (2018.01)
*G02B 30/26* (2020.01)
(Continued)

(52) U.S. Cl.
CPC ............ *G02B 30/26* (2020.01); *G02B 27/42* (2013.01); *G02B 30/25* (2020.01); *G02F 1/1368* (2013.01);
(Continued)

(58) Field of Classification Search
CPC ................ G02F 1/1335; G02F 1/1368; G02F 1/133528; G02F 1/133504;
(Continued)

(56) References Cited

U.S. PATENT DOCUMENTS 3,728,014 A * 4/1973 Rosenblum .......... G02B 5/1871
353/38
4,426,130 A * 1/1984 Knop ................... G02B 5/1823
359/569

(Continued)

FOREIGN PATENT DOCUMENTS

| CN | 1975332 A | 6/2007 |
| CN | 102629041 A | 8/2012 |

(Continued)

OTHER PUBLICATIONS

Tamkin et al. (Applied Optics vol. 49, No. 25/Sep. 2010).*
(Continued)

*Primary Examiner* — Hoan C Nguyen
(74) *Attorney, Agent, or Firm* — Banner & Witcoff, Ltd.

(57) ABSTRACT

Disclosed are a dual-view naked-eye 3D display device and a method for manufacturing the same, and a liquid crystal
(Continued)

display device. The dual-view naked-eye 3D display device includes a thin film transistor (TFT) substrate, a diffraction grating provided on the TFT substrate, a liquid crystal layer provided on the diffraction grating, a polarizer provided on the liquid crystal layer, and a light source for emitting light to the TFT substrate. The TFT substrate includes a plurality of pixel units arranged in an array, the diffraction grating in each pixel unit having two grating patterns, and the extending directions of the light-shielding strips of the two grating patterns being at a predetermined angle.

11 Claims, 4 Drawing Sheets

(51) Int. Cl.
H04N 13/312 (2018.01)
H04N 13/324 (2018.01)
G02B 27/42 (2006.01)
G02B 30/25 (2020.01)
H04N 13/302 (2018.01)
G02F 1/1335 (2006.01)
G02F 1/1368 (2006.01)
G02F 1/13357 (2006.01)
H04N 13/30 (2018.01)
F21V 8/00 (2006.01)
G02F 1/1362 (2006.01)
G02F 1/1333 (2006.01)

(52) U.S. Cl.
CPC .. *G02F 1/133504* (2013.01); *G02F 1/133528* (2013.01); *H04N 13/302* (2018.05); *H04N 13/312* (2018.05); *H04N 13/324* (2018.05); G02B 6/005 (2013.01); G02F 1/1362 (2013.01); G02F 1/133615 (2013.01); G02F 2001/133302 (2013.01); G02F 2201/305 (2013.01); H04N 2013/405 (2018.05); H04N 2213/001 (2013.01)

(58) Field of Classification Search
CPC ... G02F 2201/305; G02F 2001/133302; G02F 1/1362; G02F 1/133615; G02B 27/26; G02B 27/225; G02B 27/42; G02B 30/25; G02B 30/26; G02B 6/005; H04N 13/302; H04N 2213/001; H04N 13/324; H04N 13/312; H04N 2013/405
See application file for complete search history.

(56) References Cited

U.S. PATENT DOCUMENTS

| | | | | |
|---|---|---|---|---|
| 5,670,205 | A | * | 9/1997 | Miyazaki .................. B41J 2/01 427/162 |
| 5,755,501 | A | * | 5/1998 | Shinohara ............ G02B 5/1866 349/118 |
| 2008/0165399 | A1 | * | 7/2008 | Ushiro ..................... G02B 1/02 359/15 |
| 2011/0141422 | A1 | * | 6/2011 | Yanagawa ......... G02F 1/133536 349/139 |
| 2011/0149018 | A1 | * | 6/2011 | Kroll ....................... G03H 1/02 348/40 |
| 2012/0162770 | A1 | * | 6/2012 | Walter ................. G02B 5/1809 359/566 |
| 2012/0249940 | A1 | * | 10/2012 | Choi .................. G02F 1/133753 349/123 |
| 2015/0138455 | A1 | * | 5/2015 | Liao ................... G02B 27/2214 349/15 |
| 2016/0342033 | A1 | * | 11/2016 | Zhao .................... G02F 1/13378 |
| 2018/0031917 | A1 | * | 2/2018 | Niu .................... G02F 1/133621 |

FOREIGN PATENT DOCUMENTS

| | | | |
|---|---|---|---|
| CN | 104395814 | A | 3/2015 |
| CN | 104460115 | A | 3/2015 |
| CN | 205318033 | * | 6/2016 |
| CN | 205318033 | U | 6/2016 |
| JP | 11109119 | A | 4/1999 |
| JP | 2014238465 | A | * 12/2014 |

OTHER PUBLICATIONS

Harvey et al. (Optical Society of America, vol. 23, No. 4/ Apr. 2006).*
James E. Harvey, Andrey Krywonos, "Understanding diffraction effects in novel systems containing nanostructures," Proc. SPIE 6289, Novel Optical Systems Design and Optimization IX, 62890M (Sep. 6, 2006).*
John L. McClain, Jr. and Francis T. S. Yu (Opt. Eng. 35(4) 951-954 (Apr. 1996)).*
Oct. 10, 2016—(WO) International Search Report and Written Opinion Appn PCT/CN2016/093607 with English Tran.
Jun. 14, 2019—(CN) Second Office Action Appn 201610012569.9 with English Translation.
Fattal, et al., "A Multi-Directional Backlight for a Wide-Angle, Glasses-Free Three-Dimensional Display", © Macmillian Publishers Limited, Hewlett-Packard Laboratories, Nature, vol. 495, Mar. 21, 2013, pp. 348-351.

* cited by examiner

DUAL-VIEW NAKED-EYE 3D DISPLAY DEVICE AND MANUFACTURING METHOD THEREOF, LIQUID CRYSTAL DISPLAY DEVICE

The application is a U.S. National Phase Entry of International Application No. PCT/CN2016/093607 filed on Aug. 5, 2016, designating the United States of America and claiming priority to Chinese Patent Application No. 201610012569.9 filed on Jan. 8, 2016. The present application claims priority to and the benefit of the above-identified applications and the above-identified applications are incorporated by reference herein in their entirety.

TECHNICAL FIELD

The present disclosure relates to a dual-view naked-eye 3D display device and a method for manufacturing the same, and a liquid crystal display device.

BACKGROUND

With the improvement of people's living standards, the demand for display device experience is also increasing day by day. The realization of the "dual-view function" of a display device has become a hot spot in the field. "Dual-view" means that different viewers can see different contents on a display from two different angles at the same time. Dual-view technology has three major applications, including applications in vehicles, advertising, and anti-peep display. For example, in the driving process of a vehicle, a driver views road conditions through a vehicle display while a passenger at the co-driver's seat can watch movies from the same vehicle display; different advertising contents can be viewed from public billboards from different angles, which improves the utilization efficiency of billboards; dual-view technology provides convenience for anti-peeping and confidentiality when people have to work at public places without wanting their work contents to be exposed to other people around.

However, a conventional dual-view naked-eye 3D display device is complicated with a great thickness, a large volume and a complicated process at a great cost, and thus different viewers are required to wear glasses, which limits the application occasions, leading to much inconvenience to a user and resulting in poor experience; alternatively, only 2D display is possible, and naked-eye 3D display is impossible.

SUMMARY

According to an embodiment of the present disclosure, there is provided a dual-view naked-eye 3D display device, comprising: a thin film transistor (TFT) substrate, a diffraction grating disposed on the TFT substrate, a liquid crystal layer disposed on the diffraction grating, a polarizer disposed on the liquid crystal layer, and a light source for emitting light to the TFT substrate, wherein the TFT substrate comprises a plurality of pixel units arranged in an array, and the diffraction grating in each pixel unit has two grating patterns, and extending directions of light-shielding strips of the two grating patterns have a predetermined angle therebetween.

In some examples, the base substrate of the TFT substrate is a glass substrate.

In some examples, the light source is a light source that emits collimated light.

In some examples, the diffraction grating is a sinusoidal phase grating or a blazed grating.

In some examples, the diffraction grating is a sinusoidal phase grating with an inclination angle of $\theta_G$, a grating constant of $\Lambda$, a grating length of L, a thickness of d, and a complex amplitude projection coefficient of:

$$t(r_q) = \left[\sum_{q=-\infty}^{\infty} J_q(v)\exp(i2\pi q u r_q)\right] \cdot rect\left(\frac{r_q}{L}\right)$$

wherein q represents a diffraction order of the diffraction grating; $J_q$ represents a bessel function of a first kind at q-th order; $u=1/\Lambda$, which represents a spatial frequency of the grating; $r_q=(\alpha_q,\beta_q,\gamma_q)$ represents a direction cosine of outgoing light; an intensity of the outgoing light is modulated by $v=2\pi\Delta nd/\lambda$, in which $\Delta n$ is a refractive index of the grating and $\lambda$ is a wavelength.

In some examples, the direction cosine of the incident light of the sinusoidal phase grating is $(\alpha,\beta,\gamma)$ and the outgoing direction of the outgoing light of the sinusoidal phase grating is $(\alpha_q,\beta_q,\gamma_q)$ where the following relationships are met:

$$\begin{cases} \alpha_q = \alpha + q\frac{\lambda}{\Lambda}\cos\theta_G \\ \beta_q = \beta + q\frac{\lambda}{\Lambda}\sin\theta_G \\ \gamma_g = (1 - \alpha_q^2 - \beta_q^2)^{1/2} \end{cases}$$

In some examples, among the plurality of pixel units on the TFT substrate, the angle between the light-shielding strips of the two grating patterns corresponding to some pixel units is different from the angle corresponding to the other pixel units.

In some examples, the angles between the extending directions of the light-shielding strips of the two grating patterns corresponding to adjacent pixel units on the TFT substrate are different.

In some examples, the TFT substrate comprises an electrode structure of a twisted nematic (TN), an in-plane switch (IPS), or a vertical alignment (VA) display mode.

In some examples, each of the two grating patterns comprises a plurality of light-shielding strips parallel to and spaced from each other.

In some examples, each pixel unit comprises two sub-pixels, each sub-pixel comprising either of the two grating patterns.

In some examples, the two sub-pixels are configured to be driven independently of each other.

In some examples, the light-shielding strips of the two grating patterns extend in different directions.

According to an embodiment of the present disclosure, there is provided a liquid crystal display device, comprising the above device.

According to an embodiment of the present disclosure, there is provided a method for manufacturing a dual-view naked-eye 3D display device, comprising: providing a diffraction grating on a thin film transistor (TFT) substrate; providing a liquid crystal layer on the diffraction grating; providing a polarizer on the liquid crystal layer; and providing a light source for emitting light to the TFT substrate; wherein the TFT substrate comprises a plurality of pixel units arranged in an array, and the diffraction grating in each pixel unit has two grating patterns, and extending directions of the light-shielding strips of the two grating patterns have a predetermined angle therebetween.

BRIEF DESCRIPTION OF THE DRAWINGS

In order to clearly illustrate the technical solutions of the embodiments of the present invention, the drawings of the embodiments are briefly described below. Apparently, the drawings described below relate to only some embodiments of the present invention and thus are not limitative of the present invention.

DETAILED DESCRIPTION

To make clearer the objects, technical solutions and advantages of the embodiments of the present invention, a clear and full description of the technical solutions of the embodiments of the present invention will be made with reference to the accompanying drawings of the embodiments of the present invention. Apparently, the described embodiments are just part rather than all of the embodiments of the present invention. Based on the embodiments of the present invention described, all the other embodiments obtained by a person of ordinary skill in the art, without any creative labor, fall within the scope of protection of the present invention.

Embodiments of the present disclosure provide a dual-view naked-eye 3D display device and a method for manufacturing the same, and a liquid crystal display device, so as to greatly reduce the thickness of the dual-view naked-eye 3D display device and simplify its structure, thereby leading to a simple process and a lower cost and making it unnecessary for a user to wear glasses.

Figure 1:
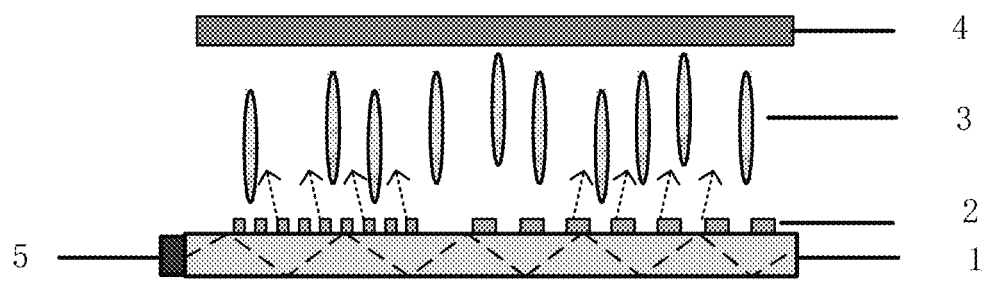
FIG. 1 is a structural schematic view of a dual-view naked-eye 3D display device according to an embodiment of the present disclosure.
Figure 2:
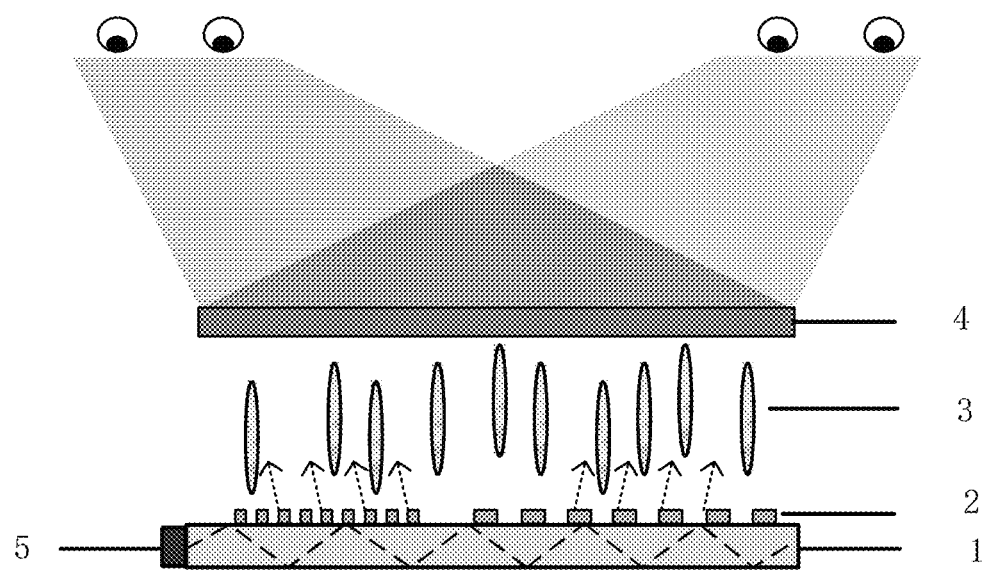
FIG. 2 is a schematic view for a dual-view naked-eye 3D display device according to an embodiment of the present disclosure to achieve dual-view function.

Embodiments of the present disclosure provide a thinned dual-view naked-eye 3D display device, as illustrated in FIG. 1, the device being mainly comprised of a thin film transistor (TFT) substrate 1, a diffraction grating 2, a liquid crystal layer 3, a polarizer 4, and a light source 5. The polarizer 4 can be construed as an upper polarizer as compared with a conventional liquid crystal display device, but the thinned dual-view naked-eye 3D display device according to embodiments of the present disclosure has no lower polarizer or a color film substrate, thus making the display device thinner. Referring to FIG. 2, the addition of the diffraction grating 2 can achieve the dual-view function of the naked-eye 3D display device.

The incident light emitted from the light source 5 to the TFT substrate 1 is collimated light, i.e., the light-emitting direction is definite, and there is no light in a plurality of directions, for example, polarized light. The incident light emitted from the light source 5 will not change the polarizing direction after passing through the TFT substrate 1 and the diffraction grating 2. Therefore, the dual-view naked-eye 3D display device according to embodiments of the present disclosure does not require a lower polarizer, i.e., only one polarizer is required.

The TFT substrate in the thinned dual-view naked-eye 3D display device according to embodiments of the present disclosure can be, for example, a TFT glass substrate which can serve as a light guide plate. Referring to FIG. 1 or FIG. 2, some incident light of the light source 5 exits on the surface of the TFT glass substrate 1 and emits on the diffraction grating 2 approximately vertically; the other incident light involves total internal reflection within the TFT glass substrate 1, and finally exits on the surface of the TFT glass substrate 1 and emits on the diffraction grating 2 approximately vertically; this structure enables the outgoing light on the surface of the TFT glass substrate to exit approximately vertically, thereby improving the luminous efficiency. This structure omits the backlight module structure, thereby not only reducing the thickness of the dual-view naked-eye 3D display device, but also reducing the cost.

Figure 3:
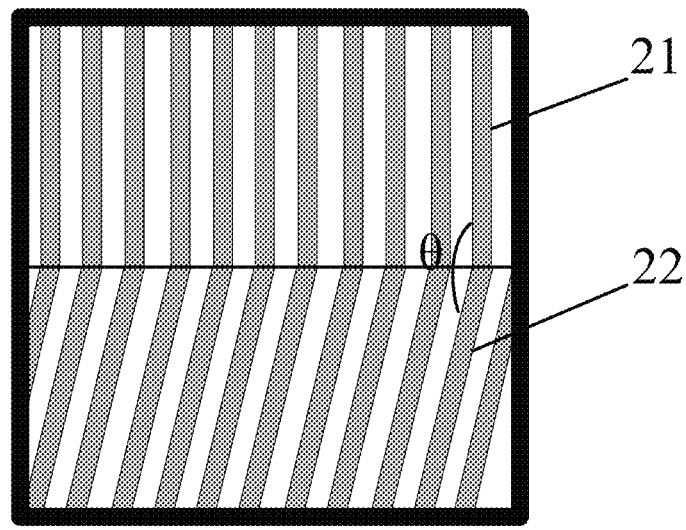
FIG. 3 is a schematic view of a pattern of a diffraction grating corresponding to one pixel according to an embodiment of the present disclosure.
Figure 4:
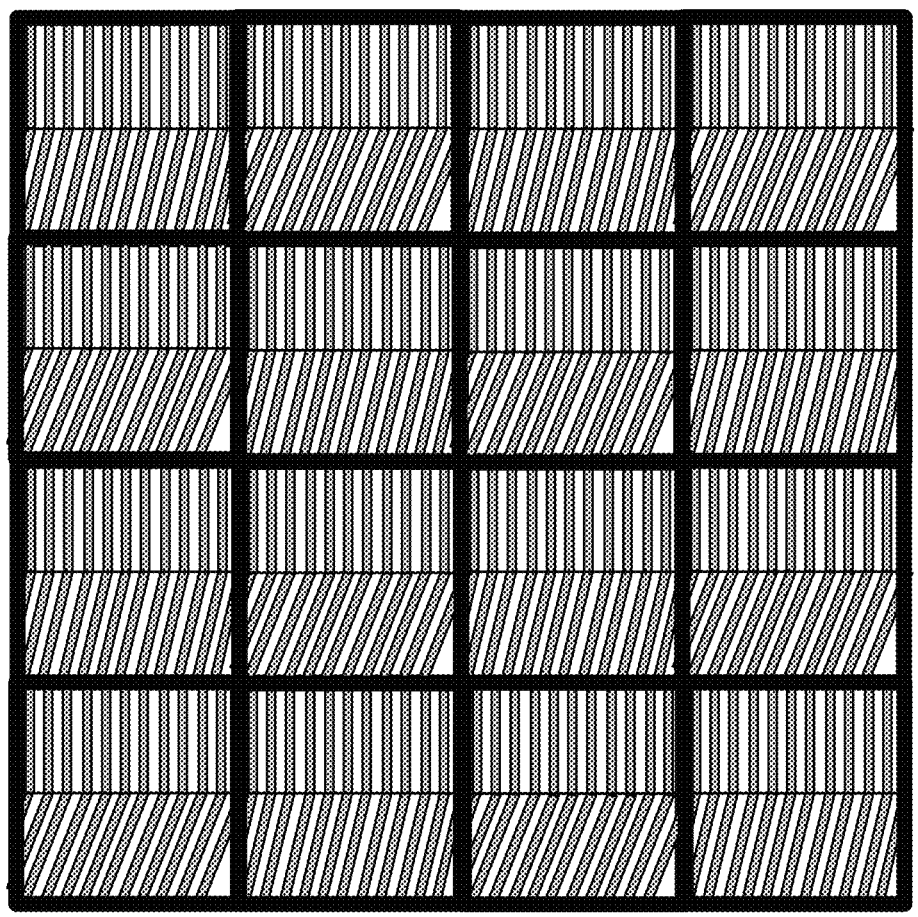
FIG. 4 is a schematic view of an overall pattern of a diffraction grating according to an embodiment of the present disclosure.
Figure 5:
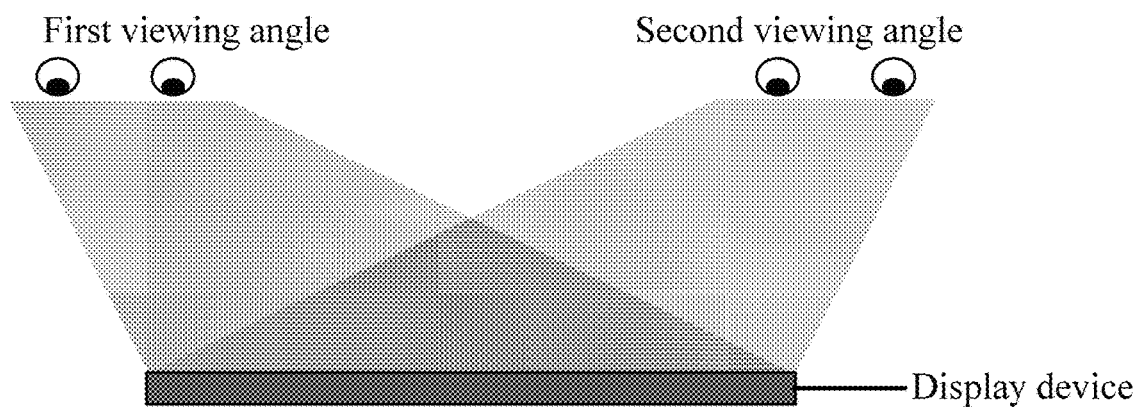
FIG. 5 is a schematic view for a dual-view naked-eye 3D display device according to an embodiment of the present disclosure to achieve dual-view function.

The diffraction grating 2 in the thinned dual-view naked-eye 3D display device according to embodiments of the present disclosure is formed on the TFT substrate 1, each pixel unit on the TFT substrate 1 comprising two grating patterns, as illustrated in FIG. 3. The light-shielding strips of the upper and lower grating patterns are at a certain angle, i.e., the extending directions of the light-shielding strips are at a certain angle. Referring to FIG. 3, the light-shielding strip 21 of the upper grating and the light-shielding strip 22 of the lower grating have a predetermined angle θ, which can be set upon actual requirement and no limitation is made in the embodiments of the present disclosure. The pattern of the diffraction grating of the entire display region on the TFT substrate is arranged as illustrated in FIG. 4. The diffraction grating having the structure enables light to exit at two angles after passing through the dual-view naked-eye 3D display device, such that a viewer can see different display contents from two different angles, as illustrated in FIG. 5. For example, the TFT substrate 1 comprises a plurality of pixel units arranged in an array.

For example, each of the two grating patterns comprises a plurality of light-shielding strips parallel to and spaced from each other.

For example, the light-shielding strips of the two grating patterns extend in different directions.

As illustrated in FIG. 4, for example, each pixel unit comprises two sub-pixels (e.g., two regions divided by a horizontal line of the center line in each pixel unit in FIG. 4), each sub-pixel comprising either of the two grating patterns. For example, the two sub-pixels are configured to be driven independently of each other, so that they can be used to display different images, respectively.

The principle of action of the diffraction grating is described below:

For example, the diffraction grating is a sinusoidal phase grating with an inclination angle of $\theta_G$, a grating constant of Λ, a grating length of L, a thickness of d, and a complex amplitude projection coefficient of:

$$t(r_q) = \left[\sum_{q=-\infty}^{\infty} J_q(v)\exp(i2\pi q u r_q)\right] \cdot rect\left(\frac{r_q}{L}\right) \quad \text{Equation 1}$$

wherein q represents a diffraction order of the diffraction grating; $J_q$ represents a bessel function of a first kind at q-th order; $u=1/\Lambda$, which represents a spatial frequency of the grating; $r_q=(\alpha_q,\beta_q,\gamma_q)$ represents a direction cosine of outgoing light; an intensity of the outgoing light is modulated by $v=2\pi\Delta nd/\lambda$, in which $\Delta n$ is a refractive index of the grating and $\lambda$ is a wavelength.

As such, it can be seen that the sinusoidal phase grating can modulate the phase of the incident light, for example, after the incident light having a direction cosine of $(\alpha,\beta,\gamma)$ passes through the sinusoidal phase grating, its outgoing direction is changed to be $(\alpha_q,\beta_q,\gamma_q)$, where the relationships as shown by Equation 2 are met:

$$\begin{cases} \alpha_q = \alpha + q\frac{\lambda}{\Lambda}\cos\theta_G \\ \beta_q = \beta + q\frac{\lambda}{\Lambda}\sin\theta_G \\ \gamma_g = (1-\alpha_q^2-\beta_q^2)^{1/2} \end{cases} \quad \text{Equation 2}$$

Therefore, each of the pixels according to the embodiments of the present invention is etched with two gratings at an angle, which allows light to exit at two angles and enter the human eye, as illustrated in FIG. 5, without a loss of resolution at either angle. The angles of the upper and lower gratings corresponding to different pixels may be the same or different.

Figure 6:
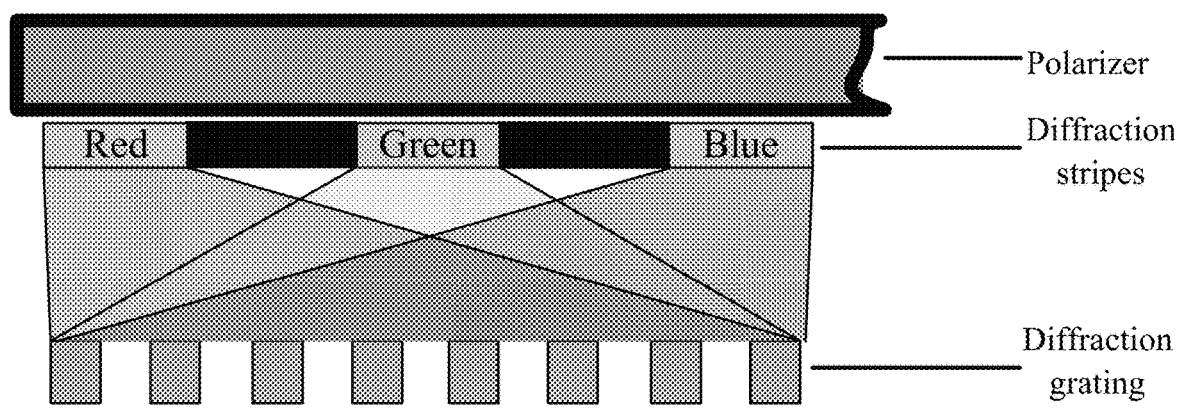
FIG. 6 is a schematic view for a dual-view naked-eye 3D display device according to an embodiment of the present disclosure to achieve color display.

As can be seen from Equation 2, the outgoing angle of light is related to the wavelength $\lambda$. Because red (R), green (G) and blue (B) have different wavelengths, the angles of the light emitted by different colors will be slightly different after the light emitted from the light source passes through the diffraction grating. The grating parameters are appropriately adjusted to achieve the effect as illustrated in FIG. 6. Therefore, the dual-view naked-eye 3D display device according to embodiments of the present invention can achieve color display without a color film structure. For example, the gray scale of light of different colors is modulated by liquid crystal, and thus different colors can be displayed.

Figure 7:
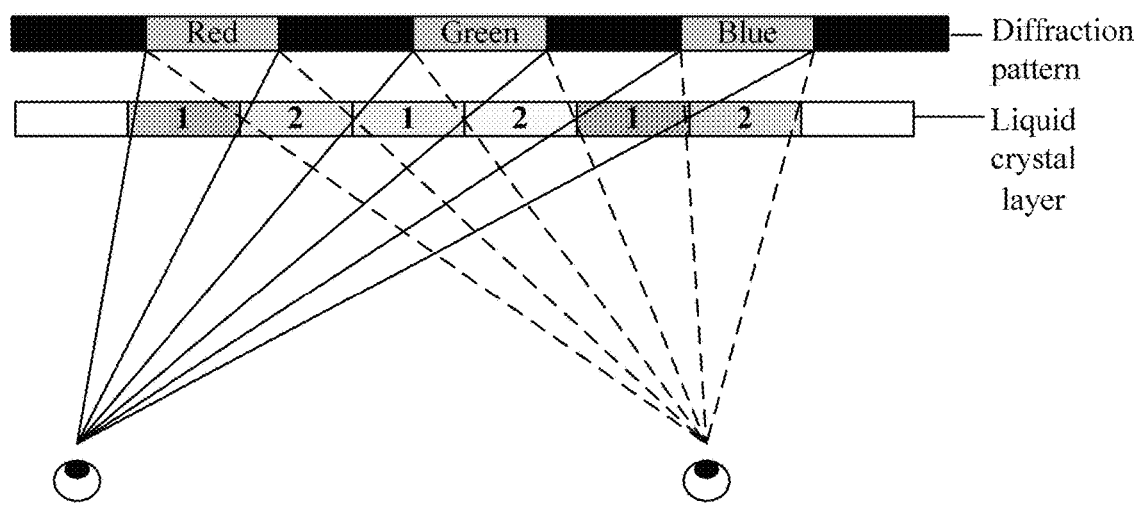
FIG. 7 is a schematic view for a dual-view naked-eye 3D display device according to an embodiment of the present disclosure to achieve naked-eye 3D display.

According to the diffraction theory of light, the diffraction pattern passing through the grating is a stripe between light and dark, so that naked-eye 3D display can be realized, as illustrated in FIG. 7. Black stripes and the part where light energy is zero are equivalent to the grating of a traditional naked-eye 3D display device, and enable the contents displayed by two adjacent pixels to be accepted only by the left eye and the right eye of the viewer, respectively; the viewer can feel the 3D effect with depth of field if the displays on the left view and the on the right view are slightly different.

It shall be noted that in the embodiments of the present invention, the arrangement of the grating patterns on each pixel is not limited as long as the light-shielding strips of the upper and lower gratings form a certain angle to enable the outgoing light to exit at two different angles (the arrangement between pixels and pixels is not limited); besides, the electrode structure of the TFT substrate is not limited, for example, the electrode structure of the TN, IPS or VA display mode is accepted.

Embodiments of the present invention provide a liquid crystal display device, comprising the dual-view naked-eye 3D display device according to embodiments of the present invention.

Figure 8:
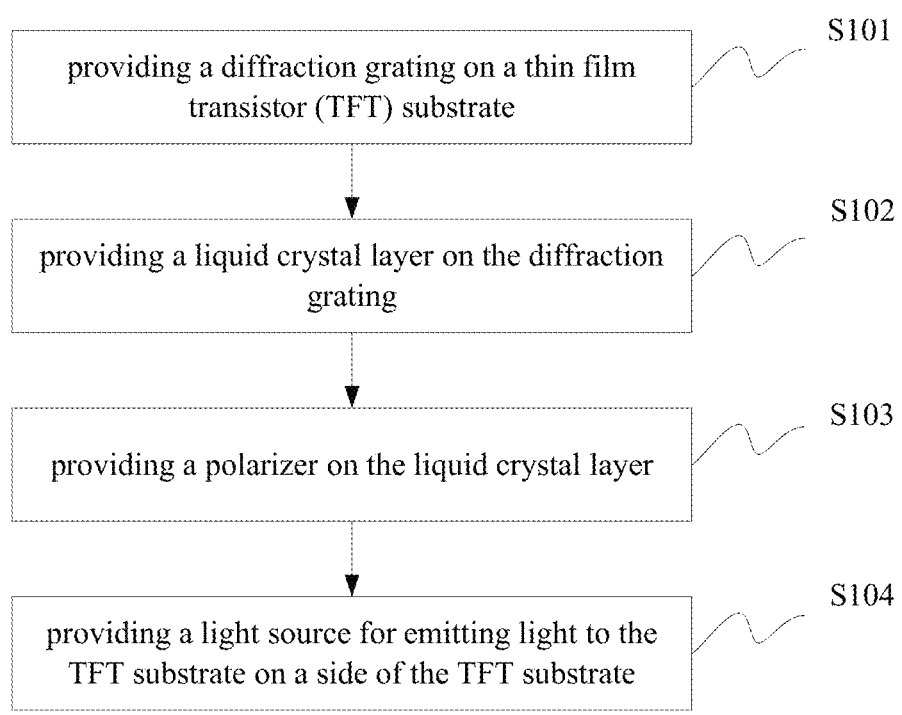
FIG. 8 is a flow chart of a method for manufacturing a dual-view naked-eye 3D display device according to an embodiment of the present disclosure.

Referring to FIG. 8, embodiments of the present invention provide a method for manufacturing a dual-view naked-eye 3D display device, comprising:

S101: providing a diffraction grating on a thin film transistor (TFT) substrate;

S102: providing a liquid crystal layer on the diffraction grating;

S103: providing a polarizer on the liquid crystal layer; and

S104: providing a light source for emitting light to the TFT substrate at a side of the TFT substrate.

For example, the diffraction grating is formed on the TFT substrate, wherein each pixel unit on the TFT substrate corresponds to two grating patterns on the diffraction grating, the light-shielding strips of the two grating patterns being at a predetermined angle.

In conclusion, the dual-view naked-eye 3D display device and the liquid crystal display according to embodiments of the present invention realize a thinner device having a dual-view naked-eye 3D display function by omitting a lower polarizer and a color film substrate and by adding a diffraction grating. Compared with the existing technology, the thinner device has a thickness far less than that of an ordinary LCD display device, can achieve naked-eye 3D dual-view display, does not require a user to wear any external equipment, is more portable, has a simpler structure and a simpler process at a lower cost, is not limited to any application occasions, and is conducive to the further promotion and use of the dual-view naked-eye 3D display device.

The above are merely exemplary embodiments of the present invention, and are not intended to limit the scope of protection of the present invention, which is yet determined by the appended claims.

The present application claims the priority of the Chinese patent application No. 201610012569.9 submitted on Jan. 8, 2016, and the content disclosed in the above Chinese patent application is incorporated herein by reference as part of the present application.

The invention claimed is:

1. A dual-view naked-eye 3D display device, comprising:
a thin film transistor (TFT) substrate;
a diffraction grating disposed on the TFT substrate;
a liquid crystal layer disposed on the diffraction grating;
a polarizer disposed on the liquid crystal layer; and
a light source for emitting light to the TFT substrate,
wherein the TFT substrate comprises a plurality of pixel units arranged in an array, the diffraction grating in each pixel unit has two grating patterns, extending directions of light-shielding strips of the two grating patterns have a predetermined angle therebetween, and the light source is a light source that emits collimated light,
wherein each pixel unit comprises two sub-pixels, each sub-pixel comprising either of the two grating patterns,
wherein the two sub-pixels are configured to display corresponding different images, and
wherein angles between extending directions of the light-shielding strips of the two grating patterns corresponding to adjacent pixel units on the TFT substrate are different.

2. The device according to claim 1, wherein a base substrate of the TFT substrate is a glass substrate.

3. The device according to claim 1, wherein the diffraction grating is a sinusoidal phase grating or a blazed grating.

4. The device according to claim 1, wherein, among the plurality of pixel units on the TFT substrate, an angle between the light-shielding strips of the two grating patterns corresponding to some pixel units is different from that corresponding to other pixel units.

5. The device according to claim 1, wherein the TFT substrate comprises an in-plane switching (IPS), or a vertical alignment (VA) display mode.

6. The device according to claim 1, wherein each of the two grating patterns comprises a plurality of light-shielding strips parallel to and spaced from each other.

7. The device according to claim 1, wherein the light-shielding strips of the two grating patterns extend in different directions.

8. A liquid crystal display equipment, comprising the device according to claim 1.

9. A method for manufacturing a dual-view naked-eye 3D display device, comprising:
provided a diffraction grating on a thin film transistor (TFT) substrate;
providing a liquid crystal layer on the diffraction grating;
providing a polarizer on the liquid crystal layer; and
providing a light source for emitting light to the TFT substrate,
wherein the TFT substrate comprises a plurality of pixel units arranged in an array, the diffraction grating in each pixel unit has two grating patterns, extending directions of light-shielding strips of the two grating patterns have a predetermined angle therebetween, and the light source is a light source that emits collimated light,
wherein each pixel unit comprises two sub-pixels, each sub-pixel comprising either of the two grating patterns,
wherein the two sub-pixels are configured to display corresponding different images, and
wherein angles between extending directions of the light-shielding strips of the two grating patterns corresponding to adjacent pixel units on the TFT substrate are different.

10. The liquid crystal display equipment according to claim 8, wherein a base substrate of the TFT substrate is a glass substrate.

11. The liquid crystal display equipment according to claim 8, wherein the diffraction grating is a sinusoidal phase grating or a blazed grating.

* * * * *